Sept. 13, 1955       M. LORENZ       2,717,968
ELECTRIC MOTOR AND GEARING UNIT
Filed March 4, 1953
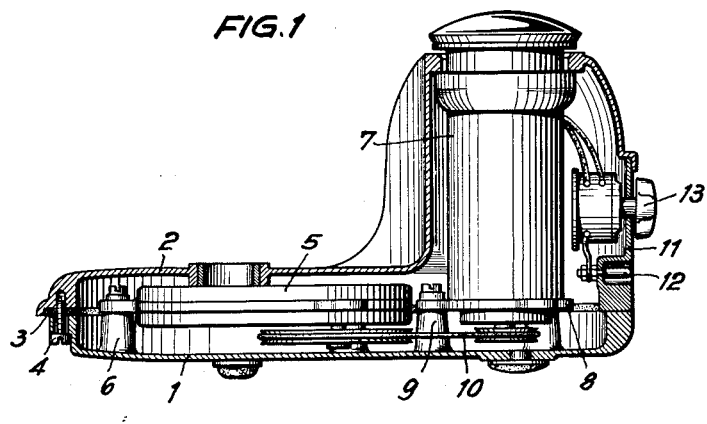
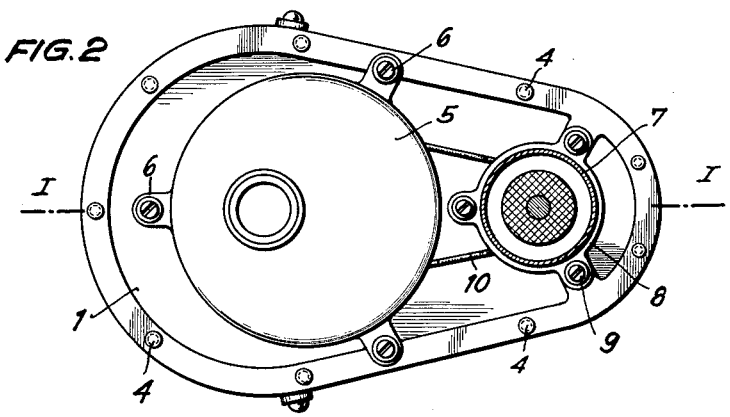
INVENTOR
Max Lorenz
by
Stevens, Davis Miller & Mosher
his attorneys

United States Patent Office 2,717,968
Patented Sept. 13, 1955

2,717,968
ELECTRIC MOTOR AND GEARING UNIT

Max Lorenz, Leonberg, Germany, assignor to Robert Bosch G. m. b. H., Stuttgart, Germany Application March 4, 1953, Serial No. 340,293

Claims priority, application Germany March 15, 1952

9 Claims. (Cl. 310—83)

This invention relates to a supporting and driving apparatus, more particularly for kitchen appliances which are interchangeable in relation to the apparatus, of the type having a casing consisting of a base and a cover part which combine to enclose the gear mechanism and driving motor of the apparatus.

An object of this invention is to simplify and cheapen the construction and the manufacture of a supporting and driving apparatus of the type set forth, and the invention is characterised in that the gear mechanism and the driving motor of the apparatus are mounted solely on the base part of the casing.

Since, under this invention, only one casing part is adapted to receive the various appliances, the manufacture of the casing may be simplified and the necessary clearances maintained more accurately by simple means than when two casing parts are used for the support and mounting of the gear mechanism and the driving motor. A further advantage obtained by this invention is that the cover part of the casing is not subjected to any strain and it therefore may consist of a light moulded part of artificial resin or the like, for example.

The invention is further described with reference to the accompanying drawings which illustrate a preferred form of the invention by way of example only, and in which:

Fig. 1 is a longitudinal section on the line I—I, Fig. 2, through the supporting and driving apparatus, and Fig. 2 is a plan view of the base part of the apparatus fitted with the gear mechanism and electric motor, the latter being shown in cross section.

Referring to the drawings, the casing of the apparatus consists of a bowl shaped base part 1 and a complementary cover part 2. These parts fit one on the other and are shaped to provide confronting inturned rims or edges which are secured together at several points, after the insertion of packing discs 3, by screws 4.

A speed reduction gear unit generally designated 5 is mounted in a casing which is firmly screwed at three points to threaded sockets 6 extending upwardly from the base part 1. An electric motor unit generally designated 7 is mounted in a casing supported on a base 8 which is also secured at three points to further threaded sockets or lugs 9 in the base part 1. The motor shaft of unit 7 drives the gear mechanism of gear unit 5 by means of a belt 10 which passes around pulleys as shown in Fig. 1.

The cover part 2 is shaped to conform largely to the shape of the parts which project from the base part 1.

To the edge or rim of the base part 1 there is mounted an insulating plate or panel 11 which is provided with a socket 12 for connecting the plug of the power cable and with a switch 13 for switching the electric motor on and off or for adjusting the speed of the motor. The insulating plate 11 is accommodated in a correspondingly shaped cut-out portion in the side of the cover part 2 surrounding the motor unit 7.

The motor and gear units may be assembled on a carrier rail or like support and then this assembly may be inserted in the base part 1 as a single unit.

I claim:

1. In a supporting and driving apparatus, more particularly for kitchen appliances interchangeable in relation to the apparatus, the combination of a speed reduction gear unit having securing lugs projecting therefrom, an electric motor unit having securing lugs projecting therefrom, and a casing housing said gear and motor units, said casing consisting of a shallow, flat bowl shaped base part and a cover part, a series of threaded sockets on the base part some of which being spaced to coincide with the securing lugs on the gear unit and others of which being spaced to coincide with the securing lugs on the motor unit, and said sockets being adapted to support the gear and motor units such that a space is provided between the bottom interior of the base part and the units, and respective pulleys on the gear and motor units and a belt transmission connecting said pulleys, said pulleys and transmission being accommodated in said space.

2. Apparatus according to claim 1 in which said sockets are spaced so as to provide three securing points for each unit.

3. In a supporting and driving apparatus, more particularly for kitchen appliances interchangeable in relation to the apparatus, the combination of a speed reduction gear unit having securing means projecting therefrom, an electric motor unit having securing means projecting therefrom, a casing housing said gear and motor units, said casing comprising a shallow, flat, bowl-shaped base part and a cover part, said base part being provided with securing means cooperating with the securing means of said gear and motor units to support said gear and motor units so that a space is provided between the bottom interior of the base part and said units, and a driving transmission connecting the gear and motor units and being accommodated in said space.

4. In a supporting and driving apparatus, especially for kitchen appliances interchangeable in relation thereto, having a casing comprising a base part and a cover part which combine to enclose a transmission gearing and an electric driving motor of the apparatus, the combination including connecting and switching means for the motor, which project above the edge of the base part, are supported by the base part and are accommodated in a correspondingly shaped cut-out portion in the marginal edge of the cover part.

5. An apparatus as claimed in claim 4, in which the transmission gearing and the motor are mounted in the base part and are surrounded by the cover part.

6. An apparatus as claimed in claim 4, in which the transmission gearing and the motor are each mounted as separate units, with the motor in driving engagement with the gearing, upon a common supporting member which, in turn, is mounted upon the base part of the casing.

7. An apparatus as claimed in claim 4, in which the connecting and switching means are disposed on an insulating panel which is detachably mounted on the marginal edge of the base part.

8. An apparatus as claimed in claim 4, in which the base part is in the form of a shallow bowl and the cover part is shaped to conform substantially to the shape of the interior parts which project from the base part.

9. An apparatus as claimed in claim 4, in which the cover part is moulded from artificial resin.

References Cited in the file of this patent

UNITED STATES PATENTS

| 648,106 | Heinz | Apr. 24, 1900 |
| 1,611,859 | Moore | Dec. 21, 1926 |
| 1,785,798 | Weiss | Dec. 23, 1930 |
| 1,918,695 | Gilbert | July 18, 1933 |
| 2,322,921 | Carlson | June 29, 1943 |
| 2,342,908 | Stoner | Feb. 29, 1944 |

FOREIGN PATENTS

| 544,672 | Great Britain | Apr. 23, 1942 |
| 616,468 | Germany | July 29, 1935 |
| 253,909 | Switzerland | Nov. 16, 1948 |